United States Patent [19]

Moser et al.

[11] Patent Number: 4,676,208
[45] Date of Patent: Jun. 30, 1987

[54] AIR-COMPRESSING RECIPROCATING-PISTON-EQUIPPED INTERNAL COMBUSTION ENGINE

[75] Inventors: Franz Moser, Steyr; Franz Rammer, Wolfern; Helmut Priesner, Steyr, all of Austria

[73] Assignee: Steyr-Daimler-Puch AG, Vienna, Austria

[21] Appl. No.: 859,717

[22] Filed: May 5, 1986

[30] Foreign Application Priority Data

May 14, 1985 [AT]  Austria ............................... 1442/85

[51] Int. Cl.[4] ............................................. F02F 3/26
[52] U.S. Cl. .................................. 123/276; 123/279; 123/301
[58] Field of Search ................... 123/276, 279, 301

[56] References Cited

U.S. PATENT DOCUMENTS

| | | | |
|---|---|---|---|
| 2,851,019 | 9/1958 | Flaming et al. | 123/276 |
| 3,954,089 | 5/1976 | Hardesty et al. | 123/276 |
| 4,108,116 | 8/1978 | Ohta | 123/276 |
| 4,281,629 | 8/1981 | List | 123/279 |
| 4,311,122 | 1/1982 | Banba et al. | 123/279 |
| 4,392,465 | 7/1983 | Cesolters et al. | 123/276 |
| 4,522,173 | 6/1985 | Agacha | 123/301 |

*Primary Examiner*—Raymond A. Nelli

*Attorney, Agent, or Firm*—Marmorek Guttman & Rubenstein

[57] ABSTRACT

An air-compressing reciprocating piston-equipped internal combustion engine comprises, in a piston head of the piston, a cavity being axially symmetrical about a central cavity axis and constituting a combustion chamber, as well as a fuel injection nozzle for injecting fuel directly into the said cavity. The nozzle has a longitudinal nozzle axis which encloses with the central cavity axis an acute angle. In order to generate a rotary motion of an air charge fed into the said cavity, there is provided a correspondingly designed air-feeding unit. A uniform distribution of the fuel in the cavity serving as combustion chamber is achieved by subdividing the cavity into imaginary compartments with the aid of dividing planes extending parallel with the central cavity axis, and each dividing plane through a different one of the axes through at least three orifices of the nozzle, in such a manner that the ratio of the fuel quantity ejected by a given nozzle orifice, in a specific injection phase, to the total amount of fuel ejected by all orifices of the nozzle during the same phase is about equal to the ratio of the volume of the respective imaginary compartment, following in the direction of air charge rotation after the said given nozzle, to the entire volume of the air charge in the piston cavity serving as the combustion chamber.

4 Claims, 3 Drawing Figures

AIR-COMPRESSING RECIPROCATING-PISTON-EQUIPPED INTERNAL COMBUSTION ENGINE

BACKGROUND OF THE INVENTION

This invention relates to an air-compresing reciprocating piston-equipped internal combustion engine comprising at least one piston having a piston head with a frontal face and a cavity, in the frontal face, which cavity has a central cavity axis, is of axially symmetrical shape, and serves as a combustion chamber;

a fuel injection nozzle having at least three orifices and being traversed by a longitudinal nozzle axis substantially intersecting the central cavity axis and encloses an accute angle therewith; and an air-feeding unit adapted for introducing into the cavity an air charge and generating an air flow thereof in rotary motion;

each of the nozzle orifices having a central orifice axis extending therethrough and intersecting all other orifice axes in a common central point of intersection inside the nozzle, the combustion chamber-constituting cavity being divisable into a number of partial volumes or imaginary compartments allocable each to one of the fuel jets.

For reasons of construction, it is practically unavoidable that the said fuel injection nozzle is mounted with its nozzle axis in an oblique position relative to the central cavity axis, and this geometrical arrangement results in the individual orifice of the said nozzle having different through-flow coefficients relative to the nozzle axis, so that the quantities of fuel emitted by the different orifices present all differ from one another during an injection.

It is known so to arrange the orifices that the angles which their respective orifice axes enclose with the longitudinal nozzle axis are all of the same size, i.e. the angles between adjacent pairs of the different nozzle axes are also equal. In another known construction, the angles enclosed between every two orifice axes of adjacent orifices in the nozzle tip are of different sizes, however arcs of equal size are provided between the impingement points of these nozzle axes with the wall of the combustion chamber-constituting cavity. It has now been found that in these two known cases it is not possible to achieve an optimal preparation of the air-fuel mixture in the combustion chamber. Moreover, the fuel jets emerging from the individual nozzle orifices, which, for reasons of manufacture usually form the generatrices of a common cone whose apex is located on the longitudinal nozzle axis, impinge at different levels on the wall of the combustion chamber. This leads to an imperfect preparation of the air-fuel mixture and thus affects in a negative way the emission of smoke and off-gases as well as the consumption of fuel by the engine. Furthermore, this also causes an unfavorable uneven thermic load exerted on the piston.

It is further known from German Offenlegungsschrift No. 9 55 084 to allocate to each fuel jet emitted by the fuel injection nozzle a partial volume or compartment of the cavity serving as combustion chamber, all compartments thus allocated being of equal volume, which means that the total volume of the combustion chamber is divided by the number of fuel jets injected thereinto. In the case of a nozzle having four fuel jets, exactly one-fourth of the cavity volume is allocated to each of the jets. However, this measure will not permit either the obtainment of an optimal fuel-air mixture, because it does not take into account the fact that differing amounts of fuel are ejected from the individual orifices for the reasons explained hereinbefore.

OBJECTS AND SUMMARY OF THE INVENTION

It is therefore a main object of the invention to improve the initially described internal combustion engine in a manner such that the above-discussed drawbacks are avoided and an air-fuel mixture can be prepared in the improved engine which mixture entails decrease emissions of smoke and off-gases as well as a decrease in fuel consumption by the engine and avoidance of irregular thermic stress of the piston.

These objects and others that will become apparent from the following description of the invention are attained in an internal combustion engine of the initially described type which is improved in accordance with the invention by providing for the above-mentioned division of the combustion space-constituting cavity into imaginary compartments to be made with the aid of dividing planes extending each parallel with the central cavity axis and through a different one of the said nozzle axes, in a manner such, (while allocating to each nozzle orifice that imaginary compartment next following a given orifice in the direction of air charge rotation), that the ratio of the partial volume of that imaginary compartment to the total volume of the cavity is about equal to the ratio of the amount of fuel, ejected in a given injection phase from the respective nozzle, to the total amount of fuel injected by all orifices of the nozzle in the same phase, and siting the orifices accordingly in the nozzle tip.

We have found that, due to the different through-flow coefficients of the several orifices in the nozzle, dependent on their location in the nozzle tip leading to fuel being ejected from these orifices of the same nozzle in different quantities, the above required approximate equality of the two above-mentioned ratios is only achieved at a critical distribution of the locations of the at least three orifices in the tip of the nozzle. Only when observing the above stated condition of ratios will it be possible to achieve preparation of a good, regular air-fuel mixture in the cavity serving as the combustion chamber.

To this end, equal amounts of air charge must be admixed with equal fuel quantities, so that each droplet of fuel has the same air volume at its disposal. As the imaginary compartments of the cavity are at the same ratio with regard to their volumes as are the quantities of fuel emitted from individual nozzle orifices, to each fuel jet there is allocated a partial volume of the cavity, taken in the direction of rotation of the air charge, which corresponds to the fuel quantity ejected in the form of this jet. The fuel is therefore evenly distributed in the air available for admixture therewith in the cavity constituting the combustion chamber, whereby there is also achieved the preparation of the desired uniform, good air-fuel mixture. From this good preparation of the air-fuel mixture, there results the desired reduction of undesirable emissions and fuel consumption. Moreover, the uniform preparation of the air-fuel mixture in the entire combustion chamber-constituting cavity contributes, of course, essentially to the equalization of the thermic stresses on the piston. The optimized preparation of the air-fuel mixture enables, in particular, a combination with high output rates and high injection pressures, and shorter periods of injection and the preparation of air-fuel mixtures, so that the beginning of injection can be shifted relatively close, and of favorable efficiency, to the upper piston dead center, without delaying the end of injection in a disadvantageous manner. Thereby, it becomes possible without difficulty to reduce noticeably the emission of nitrogen oxides and of noise as well as the mechanical stresses of the engine.

When the internal combustion engine is of the type in which the tip of the injection nozzle, and thereby the point of intersection of the nozzle axes with one another, is arranged at a distance from the central cavity axis, then, downstream of a specific orifice whose axis, in its projection on to a plane normal with regard to the cavity axis, encloses with the tangent to the circumferential circle of the cavity, at the point of intersection of the nozzle axis with the said circle, an obtuse angle on the side facing toward the air charge, there follows directly, in the direction of rotation of the air charge, a partial volume or 'imaginary compartment' of the said air charge, whose volume is smaller than that volume which would be calculated to correspond with the ratio of the fuel quantity, emitted from this specific orifice, to the total amount of injected fuel. Due to the fact that the axes of the nozzle orifices enclose difangles with the tangents of the circumferential circle about the cavity, the jets from some of the orifices will be more or less accelerated due to the rotary motion of the air charge in the cavity, generated by the direction of air feed-in, and the jets from the other orifices will be more or less braked. In order to take this situation into account, the partial volumes, allocated to the individual nozzles, will be slightly corrected so that an optimal preparation of the air-fuel mixture will be guaranteed in spite of the excentric position of the tip of the injection nozzle within the cavity serving as the combustion chamber.

In a further embodiment of the invention the points of impingement of the axes of all orifices on the wall of the combustion chamber-constituting cavity lie in the same plane normal to the central cavity axis. This causes the points of impingement of all fuel jets to lie within the region of equal flow conditions of the air pushed by a piston stroke into the said cavity, thereby resulting in a further improvement of the preparation of the air-fuel mixture.

BRIEF DESCRIPTION OF THE DRAWINGS

A preferred embodiment of all parts, relevant to the invention, of an internal combustion of the initially described type with air-compressing reciprocating piston means and the features essential to the invention is described hereinafter in connection with the accompanying drawings in which.

DETAILED DESCRIPTION OF THE EMBODIMENT SHOWN IN THE DRAWINGS

In the piston head 1 of a reciprocating piston in an air-compressing internal combustion engine there is recessed a cavity 2 which is axially symmetrical about a rotary axis A and constitutes a combustion chamber. In the cylinder head 3 there is mounted a fuel injection nozzle 4 whose nozzle axis (F), which intersects the rotary cavity axis A, encloses an acute angle having the apex B.

Figure 2:
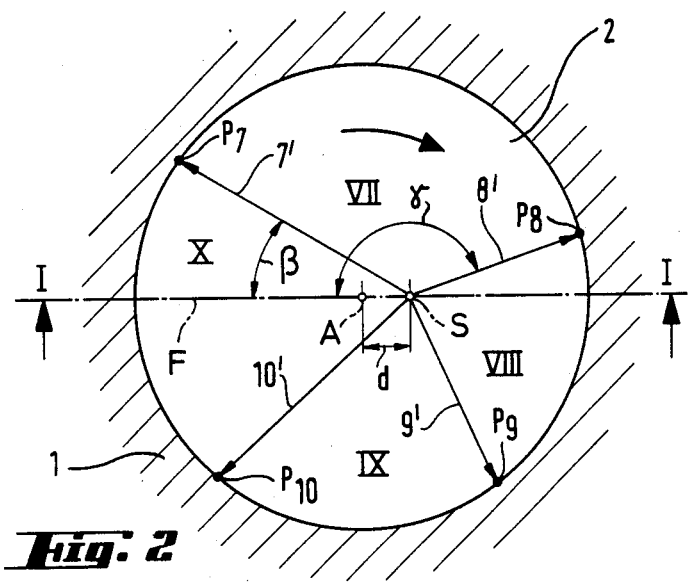
FIG. 2 is a cross-sectional view of the embodiment shown in FIG. 1, offering a top view of the combustion chamber-constituting cavity, illustrating a first injection condition.
Figure 3:
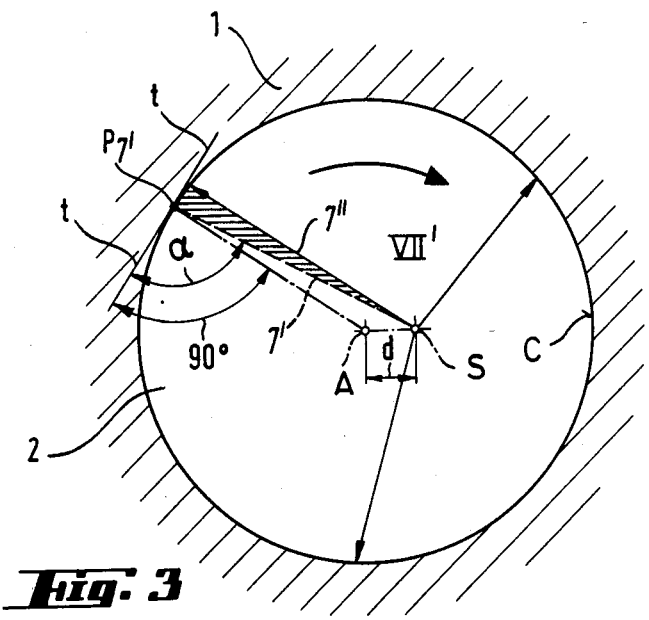
FIG. 3 is a similar view as FIG. 2, but illustrating another injection condition.

Furthermore, there is provided an air-feeding unit comprising an inlet duct 5 and entry valve 6 for the feeding of an air charge into the cavity 2, which is designed in a manner such that there is generated a rotary motion, indicated by an arrow in each of FIGS. 2 and 3, of the air charge entering the cavity 2.

Figure 1:
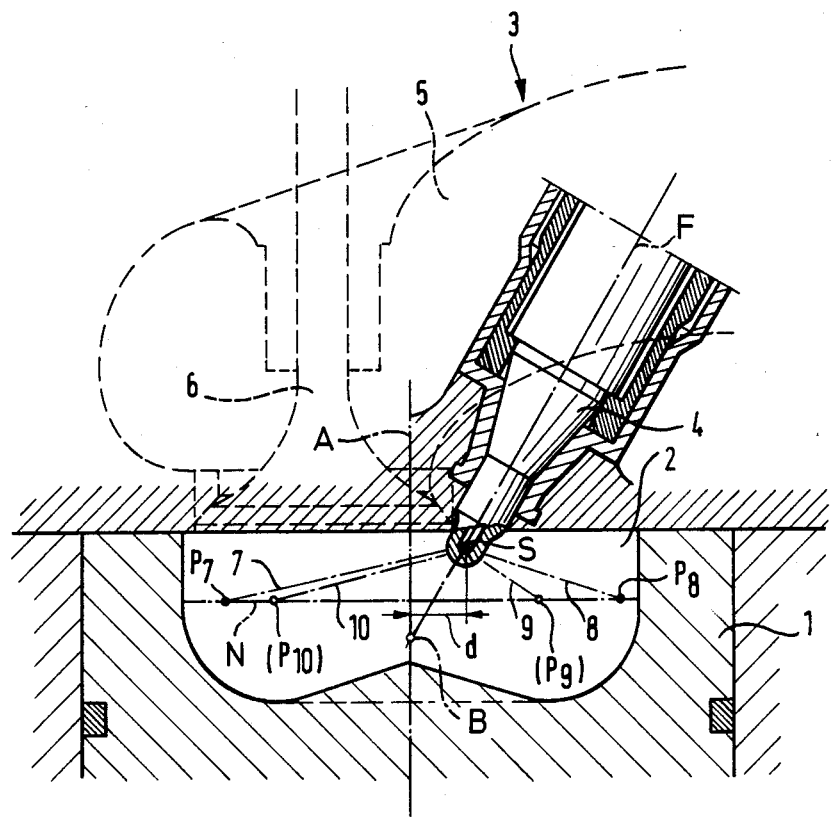
FIG. 1 is a schematic, simplified view in axial section of the aforesaid relevant parts, being taken in an axial plane indicated by I—I in FIG. 2.

The fuel injection nozzle 4 comprises four orifices having orifice axes 7, 8, 9 and 10, respectively, which intersect one another at a common nozzle center point of intersection S inside the nozzle 4 at a distance d from the cavity axis A. It is also seen from FIG. 1 that the sites of the four orifices in the nozzle 4 have been so chosen that the points of impingement $P_7$, $P_8$, $P_9$ and $P_{10}$ of the orifice axes 7, 8, 9 and 10 of all orifices of the nozzle 4 on the wall of the cavity 2 are all located in the same plane N which is normal to the cavity axis A. From the representation of the nozzle axes in FIG. 1 as shown in their projections 7, 8, 9 and 10 on the plane passing through the cavity axis A and the nozzle center point S, or their projections 7', 8', 9' and 10' on the horizontal plane N shown in FIGS. 2 and 3, it is evident that the conditions of fuel flow through the nozzle 4 along the nozzle axis F to the center point S and from there out of the orifice having the axis 7 suffering a deflection corresponding to the angle $\beta$ are much more favorable than those out of the orifice having the orifice axis 8, for, in the latter case, the angle of deflection $\gamma$ of the stream of fuel from the nozzle axis F is more than five times as large (160° instead of 30°) than in the former case, the fuel stream thus suffering almost a reversal of direction when emitted along orifice axis 8. For this reason, different quantities of fuel are emitted from the orifices of the nozzle, depending on their location in the nozzle tip during each injection.

As far as the air charge is concerned, and taking into account the rotary motion thereof as indicated by the arrow in FIG. 2, the combustion chamber can be divided by imaginary planes extending through the cavity axis A and each of the nozzle axes 7, 8, 9 and 10, respectively. Thereby, the combustion chamber-constituting cavity 2 is divided into compartments indicated by reference numerals VII, VIII, IX and X, respectively, in conformity with the respective nozzle axis located in the dividing plane upstream of the respective compartment. Thus the compartment VII has as its dividing plane upstream, taken in the direction of rotation of the air charge, the plane in which the nozzle axis 7 extends, while the compartment VIII is associated with the dividing plane through the nozzle axis 8, which dividing plane delimits this compartment VIII upstream and is located downstream of the compartment VII.

In order to apportion to each fuel amount unit emitted along a given nozzle axis into the combustion chamber the corresponding volume unit of air charge, the ratio of the amount of fuel of the jet emitted from a given nozzle orifice to the total amount of fuel injected from all orifices together of the nozzle 4, is adjusted to be approximately equal to the ratio of the volume of the respective compartment of the cavity adjacent downstream of the respective fuel jet from the given nozzle 4, to the total volume of the cavity 2.

Consequently, the volumina of the compartments VII, VIII, IX and X are at the same ratio relative to one another, as are the fuel amounts emitted from the nozzle orifices along their axes 7, 8, 9 and 10, respectively.

When these proportions are strictly observed, then, as illustrated in FIG. 3, the nozzle axis 7', for instance, will intersect the circumference C of the combustion chamber-constituting cavity at a point $P_{7'}$, and it encloses, together with the tangent t of the said circumference C at that point, an angle $\alpha$, upstream of the nozzle axis 7', which is larger than 90°. The spreading of the fuel jet emitted by this orifice of axis 7' is slightly hindered by the air charge rotating from Compartment X into Compartment VII, and, for this reason, the direction of the orifice axis is slightly changed from 7' to 7" and thus reduces the volume of the compartment slightly from VII (FIG. 2) to VII' (FIG. 3). Similar corrective changes must be made wherever the rotary motion of the air hinders to a noticeable extent the spreading of the fuel jet in the associated compartment due to the size of the angle enclosed between the respective orifice axis and the tangent of the cavity circumference C at the point of its intersection with the said orifice axis.

We have found that the positioning of the four orifice axes 7, 8, 9 and 10 in the tip of the nozzle 4 is quite critical. For, if the orifice axis 10 were shifted, by a change of the location of its orifice in the nozzle tip, in the direction of air charge rotation, to be much closer to the orifice axis 7, for instance to run along the diametrical line through points A and S, then the amount of fuel ejected through the orifice of axis 10 would be at a maximum, there being no deflection of fuel flow through the nozzle, but the portion of air available to that large amount of fuel in the imaginary compartment X, of greatly reduced size, would be evidently insufficient to achieve a good air-fuel mixture, while the much smaller amount of fuel ejected along the orifice axis 9 would have available a proportion of the air charge which would be much too large in view of the greatly increased partial volume of the imaginary compartment IX.

In FIG. 3, only three axes of jets ejected from a nozzle having only three orifices are shown.

We claim:

1. An air-compressing reciprocating piston-equipped internal combustion engine comprising
    at least one piston having a piston head with a frontal face and a cavity, in said frontal face, which cavity has a central cavity axis, is of axially symmetrical shape, and serves as a combustion chamber;
    a fuel injection nozzle having at least three orifices and being traversed by a longitudinal nozzle axis substantially intersecting said central cavity axis and enclosing an acute angle therewith; and
    an air-feeding unit adapted for introducing into said cavity an air charge and generating an air flow thereof in rotary motion;
    each of said nozzle orifices having a central orifice axis extending therethrough and intersecting all other orifice axes in a common central point of intersection inside said nozzle, said combustion chamber-constituting cavity being divisable into a number of partial volumes or imaginary compartments allocable each to one of said fuel jets; the said division of said combustion space-constituting cavity into imaginary compartments being made with the aid of dividing planes extending each parallel with the central cavity axis and through a different one of said nozzle axes, in a manner such, while allocating to each nozzle orifice that imaginary compartment next following a given orifice in the direction of air charge rotation, that the ratio of the partial volume of that imaginary compartment to the total volume of said cavity is about equal to the ratio of the amount of fuel, ejected in a given injection phase from the respective nozzle, to the total amount of fuel ejected by all orifices of said nozzle in the same phase.

2. The internal combustion engine of claim 1, wherein the point of intersection of the orifice axes in the tip of said nozzle is located at a distance from said central cavity axis, whereby a given nozzle orifice, the projection of whose orifice axis on to a plane normal to said central cavity axis encloses with the tangent of the circumferential circle about said cavity at the point of intersection of said circle with said orifice axis of said given nozzle orifice, an obtuse angle taken on the upstream side facing said air flow in rotary motion, is followed, in the direction of rotation of said air flow, by an adjacent imaginary compartment of said cavity, whose partial volume is smaller than the partial volume corresponding to the ratio of the fuel quantity ejected via said given nozzle orifice to the total amount of fuel injected into said cavity by all orifices of the respective nozzle.

3. The internal combustion engine of claim 1, wherein the points of intersection of the axes of all nozzle orifices with the wall of said combustion chamber-constituting cavity are located in the same plane normal to said central cavity axis.

4. The internal combustion engine of claim 2, wherein the points of intersection of the axes of all nozzle orifices with the wall of said combustion chamber-constituting cavity are located in the same plane normal to said central cavity axis.

* * * * *